April 4, 1950 R. O. RUNDQUIST 2,503,218
WEIGHING DEVICE

Filed July 17, 1946 2 Sheets-Sheet 1

Inventor
Roy O. Rundquist

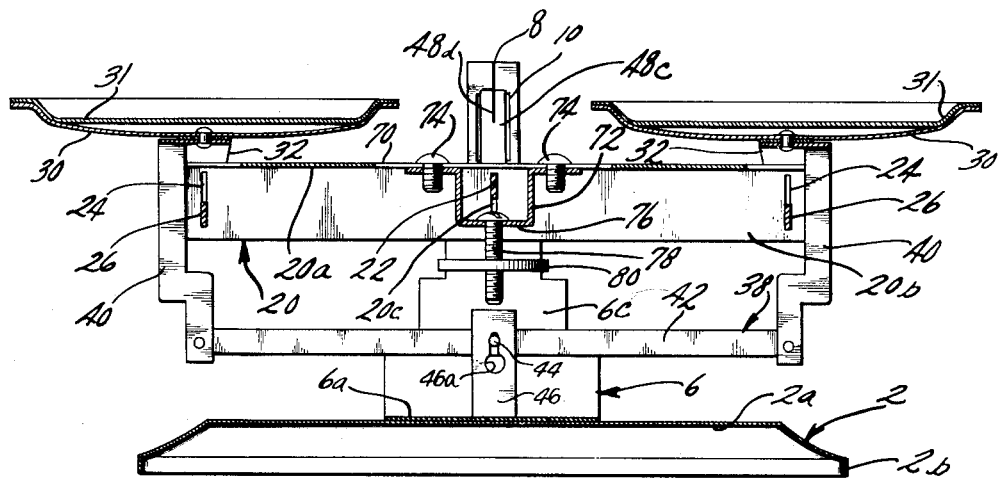
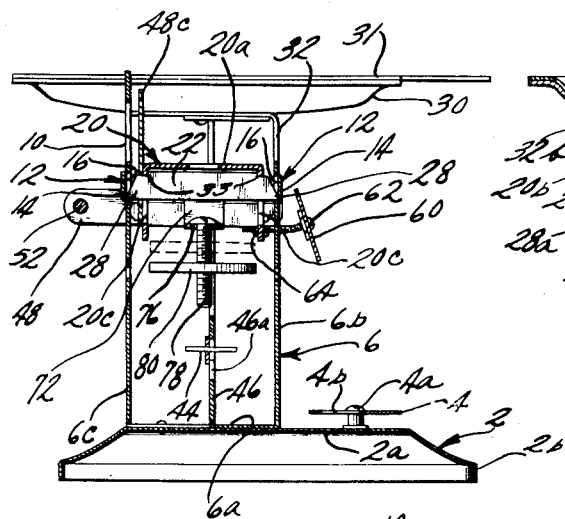
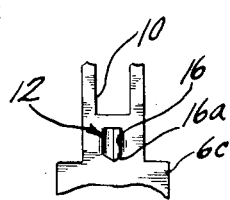

Patented Apr. 4, 1950

2,503,218

UNITED STATES PATENT OFFICE 2,503,218

WEIGHING DEVICE

Roy O. Rundquist, Chicago, Ill., assignor to Pelouze Manufacturing Co., Chicago, Ill., a corporation of Illinois Application July 17, 1946, Serial No. 684,367

3 Claims. (Cl. 265—54)

This invention relates to a weighing device, and particularly to a weighing device utilizing a pivoted balance beam.

A feature of this invention is a simplified design of all of the components of a weighing device or scale to such an extent that all of the major components thereof may be produced by stamping operations, thus permitting large quantity economical production of the assembled unit.

A further feature of this invention is the arrangement of a balance beam of the scale with respect to its main pivot in such manner that the center of mass of the balance beam and its associated mechanism is located above the main pivotal axis.

Thus, in accordance with this invention, a weight member is mounted on the balance beam and the position of such weight member is adjustable to produce a shifting of the center of gravity of the balance beam to a point below the pivotal axis for the balance beam system. Such adjustment permits the center of gravity of the balance beam system to be located below but so close to the pivotal axis as to provide an unusual degree of sensibility for the balance beam.

Accordingly, a weighing device constructed in accordance with this invention may be manufactured by stamping operations and utilize components having dimensional tolerances consistent with the production method by which they are produced, yet yielding a sensibility which was heretofore obtainable only in high cost scales produced by careful and time-consuming machining of all of the major components.

A further feature of this invention is the construction of a balance beam for a weighing device as a channel-shaped member, and the utilization of slots in the arm portions of such channel-shaped member to accommodate pivot bars which respectively provide pivot mountings for the balance beam at the center thereof and for the weight supporting trays or pans at each end of the balance beam.

Another feature of this invention relates to the formation of pivot bearings by stamping operations upon thin-walled sheet-like members. In accordance with this invention a pivot bearing is produced by punching outwardly a portion of the wall of such sheet-like members to form a recess, and concurrently forming one end wall of such recess in suitable shape to function as a pivot bearing surface.

A further feature of this invention is the provision of a balance beam supporting member comprising a one-piece stamping formed into a generally U-shape with the arms thereof upstanding. Pivot bearings are stamped into each of the upstanding arms and receive the ends of a pivot bar upon which the balance beam is supported. Furthermore, an integral upstanding projection is formed in the base of the U-shaped support member and cooperates with a weight pan leveling linkage to provide a central pivot for such linkage.

Accordingly, it is an object of this invention to provide an improved weighing device, and particularly to provide a balance beam type of weighing device having a high degree of sensibility yet capable of manufacture by economical, large quantity production methods.

A particular object of this invention is to provide a highly accurate weighing device in which all of the major components may be produced by stamping processes.

A further object of this invention is to provide an improved balance beam type weighing device wherein the balance beam system is inherently unstable, i. e., the center of gravity thereof is normally located above the main pivot, and wherein an adjustably positionable weight is mounted on the balance beam and is adjustable to bring the center of gravity of the balance beam system to a point below the axis of the main pivot point, and hence permitting the balance beam to be readily adjusted to a condition of stability and unusual sensibility.

Another particular object of this invention is to provide an improved weighing device wherein the various pivot bearings may be formed in sheet-like supporting members by stamping processes.

The specific nature of the invention as well as other objects and advantages thereof will become apparent to those skilled in the art from the following detailed description of the annexed sheets of drawings which, by way of preferred example only, illustrate one specific embodiment of the invention.

On the drawings:

Figure 3 is a vertical sectional view taken along the plane III—III of Figure 1.

Figure 4 is a vertical sectional view taken along the plane IV—IV of Figure 2.

Figure 5 is a vertical sectional view taken along the plane V—V of Figure 2.

Figure 6 is a partial elevational view of a pivot bearing constructed in accordance with this invention.

As shown on the drawings:

Figure 1:
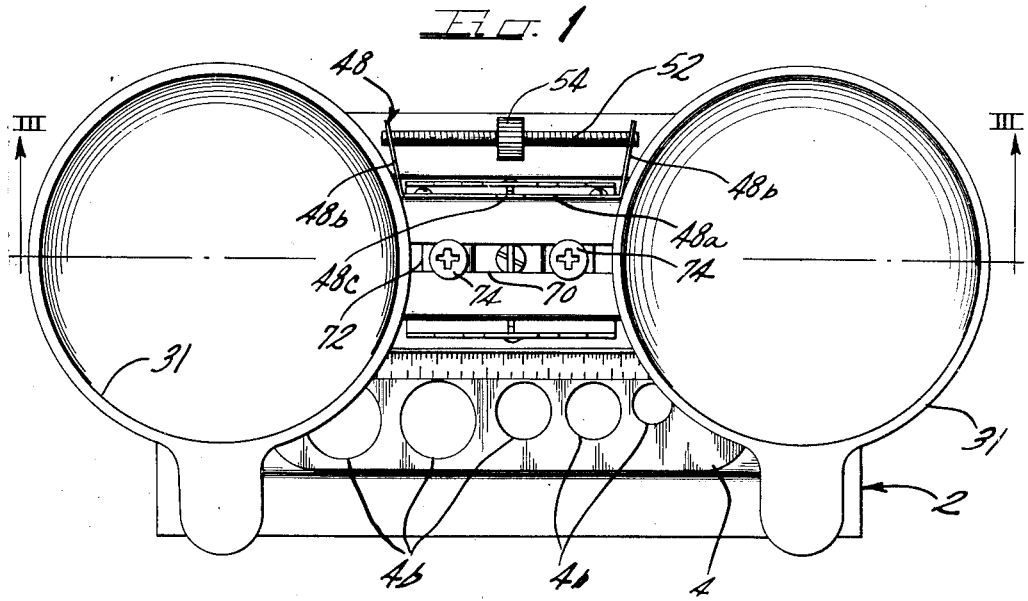
Figure 1 is a top elevational view of a weighing device constructed in accordance with this invention.
Figure 2:
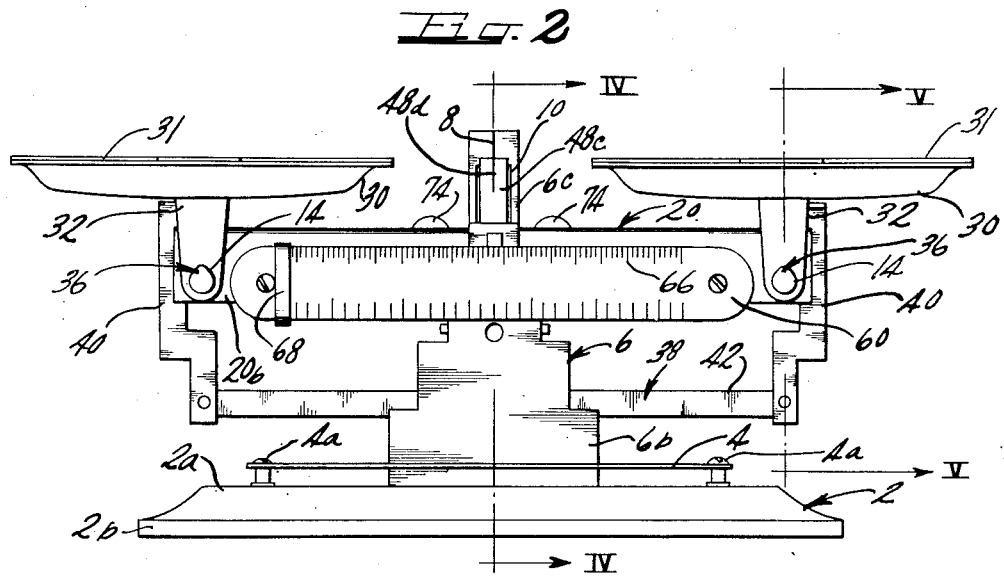
Figure 2 is a side elevational view of the weighing device of Figure 1.

The weighing device embodying this invention is mounted upon a pedestal 2 which is of generally rectangular configuration having a flat base portion 2a and downturned peripheral edges 2b. A weight holder 4 is mounted along the front edge of the base portion 2a by screws 4a and comprises a metallic strip having a plurality of varying diameter apertures 4b therein which selectively receive the various sizes of weights (not shown) which are customarily used in scales of this type.

In the rear central portion of the base 2a a beam support member 6 is mounted. The beam support member 6 may be conveniently formed in one piece by stamping operations and is of generally U-shaped configuration, having a base portion 6a which is suitably secured to the pedestal 2 and spaced upstanding front and rear arm portions 6b and 6c respectively. The rear arm portion 6c projects upwardly to a greater extent than the front arm portion 6b and is provided at the top thereof with a vertical indicating mark 8 and a generally rectangular aperture 10 which cooperate with the moving pointer of the scale in a manner that will be described in detail later.

The upstanding arm portions 6b and 6c are respectively provided with spaced, opposed pivot bearings 12 which function as the central pivot for the balance beam of the scale. In accordance with this invention, the pivot bearings 12 may be conveniently formed in the sheet-like arm portions 6b and 6c by punching out a portion 14 of the wall thereof to define recesses 16 on the inner faces of arms 6b and 6c respectively, which are located in opposed facing relationship. One end wall 16a of each of the recesses 16 is suitably shaped to function as a pivot bearing surface. In the particular example illustrated, the end walls 16a are formed in an angular configuration, as best shown in Figure 6.

In accordance with this invention, the balance beam 20 comprises a member which is generally channel-shaped in configuration and may be conviently produced by stamping operations. The beam 20 has a base portion 20a and depending arm portions 20b. Near the center of beam 20, the arm portions 20b are provided with aligned slot-like apertures 20c (Figures 3 and 4) which accommodate the end portions of a pivot bar 22. Similar apertures 24 (Figures 3 and 5) are provided near each end of beam 20 and respectively accommodate pivot bars 26. All of the pivot bars 22 and 26 are substantially identical and hence one description will suffice for all. The pivot bars are preferably formed from a heat-treated steel to supply good wearing properties to their knife edges. The end portions 28 of the pivot bars project respectively through the arms 20b of balance beam 20 and one horizontal edge 28a of such projecting end portion is shaped as a knife edge. The projecting end portions 28 are of reduced width with respect to the remainder of the pivot bars and hence define outwardly facing shoulders 33 at each end of the pivot bars. The shoulders 33 are suitably spaced so as to snugly engage against the interior faces of the arms 20b of the channel-shaped balance beam 20. Hence the pivot bars in their assembled positions in the balance beam provide lateral reinforcement to the arms 20b, preventing inward deflection thereof.

The knife edges 28a provided on the central pivot bar 22 are respectively engageable in the pivot bearings 12 and thus support the balance beam 20 for pivotal movement about a horizontal axis.

It should be noted that the vertical length of bearing recesses 16 is substantially greater than the vertical length of end portions 28a of the pivot bars 28. Hence the pivot bars may be assembled in bearing recesses 16 by pivotal movement about an axis transverse to their length. Once assembled, the punched out wall portions 14 prevent excessive lateral movement of pivot bars 22 relative to bearing recesses 16.

Adjacent each end of the balance beam 20 a weight-supporting pan 30 is pivotally mounted on the balance beam 20 through the medium of tray support brackets 32. Each tray support bracket 32 comprises a generally U-shaped sheet metal member having a base portion 32a secured to the respective weight-supporting pan 30 by a rivet 34 and downwardly depending arm portions 32b, within each of which is formed a pivot bearing 36 which is identical in all respects to the central pivot bearing 12 except that the bearing surface thereof is located at the top of the bearing recess. The bearings 36 cooperate respectively with the knife edges 28a provided on the end pivot bars 26.

To maintain the weight-supporting pans 30 level during the swinging movement of the balance beam 20, a pan leveling linkage 38 is provided. Linkage 38 comprises a pair of vertical lever members 40 which are respectively secured to the weight-supporting trays 30 on the rivets 34. A horizontal lever 42 is pivotally connected to the bottom of each of the vertical levers 40. A pin 44 (Figure 4) is mounted transversely in the central portion of horizontal lever 42 as by wedging, riveting or some other suitable means of fastening and is pivotally engaged in a vertical slot 46a which is provided in an upstanding projection 46 conveniently formed by punching up a portion of the base 6a of the beam support member 6. The linkage 38 functions in conventional manner to maintain the weight-supporting pans level as the balance beam 20 swings about its central pivot defined by the pivot bar 22 and the pivot bearings 12. Since the pin 44 is mounted in a vertical slot 46, none of the weight of the balance beam system is supported by the pin 44, and hence the accuracy of the beam system is not disturbed by the linkage 38. Trays 31 may be mounted on pans 30 if desired.

An adjustment weight support bracket 48 (Figure 1) is secured to the rear arm 20b of the beam 20. The bracket 48 is of U-shaped configuration having the base portion 48a thereof abutting the balance beam arm 20b and the arm portions 48b projecting outwardly therefrom. A screw 52 is supported between arm portions 48b in general longitudinal alignment with balance beam 20 and an adjusting weight 54 is threadably mounted on screw 52 to provide means for effecting initial balancing of the balance beam system. The base portion 48a of bracket 48 is provided with an upwardly extending projection 48c which is disposed substantially in the center of the balance beam 20 and carries thereon an indicating line 48d. The projection 48c thus may be conveniently utilized as a pointer cooperating with the indicating line 8 on beam support 6. The width of the projection 48c is preferably less than the width of the aperture 10 in the rear arm 6c of beam support 6 and hence an additional visual indication of the balanced position of the pointer 48c is afforded by comparing the position of such pointer with respect to the sidewalls of aperture 10.

A sliding weight scale 60 is mounted in general longitudinal alignment with balance beam 20 by bolts 62 which pass through suitable apertures in the front arm 20b of the balance beam 20 and are secured thereto by nuts 64. The slide scale 60 is provided with weight graduations 66 and a slide weight member 68 of ring-like configuration surrounds scale 60 and is freely slidable thereon. In the particular example illustrated, the weight graduations on the scale 66 may be in grain units.

From the described construction, it will be noted that a substantial portion of the mass of the elements forming the balance system is disposed vertically above the central pivot, which arrangement is in distinct contrast to that found in weighing devices heretofore known. It is a feature of this invention that such distribution of the mass of the balance beam system is deliberately produced and, in fact, the balance beam system is so designed that the center of gravity of the balance beam system per se is located above the central pivot defined by pivot bar 22 and the cooperating pivot bearings 12. It therefore follows that in such condition, the balance beam 20 is inherently unstable. Even though the balancing nut 54 be adjusted to provide identical distribution of mass of the balance beam system on both sides of the central pivot, the slightest force applied to one side of the balance beam system will cause deflection of the beam 20 to its limiting position. It should be noted that in such unstable condition, there is no restoring force effective upon displacement of the beam to return the beam to its neutral position.

In accordance with this invention, the balance beam system is rendered stable by the addition of an adjustably positioned weight member to the beam 20. The base portion 20a of beam 20 is provided with a slot-like aperture 70 near the center thereof and a bracket 72 of serpentine configuration is secured to balance beam 20 by screws 74 which pass through the slot-like aperture 70. Accordingly, the particular longitudinal position of the bracket 72 on the beam 20 may be conveniently adjusted within the limits of the length of the slot 70.

The bracket 72 is provided with a depending central portion 76 in which is threaded a bolt 78. The bolt 78 is thus arranged in depending relationship with respect to the balance beam 20 and it is to be noted that at least the bottom end portion of the bolt 78 should be located below the central pivot and as shown in this embodiment, the entire bolt 78 is located below the pivot point. A weight member 80 comprising an internally threaded disc is adjustably positioned on the bolt 78.

The mass of weight member 80 is so proportioned relative to the mass of the balance beam system that as the weight member 80 is moved downwardly on the screw 78 it will effect a shifting of the center of gravity of the balance beam system to a point below the central pivot. When the weight member 80 has been adjusted to attain such condition, it is obvious that the balance beam system is placed in a stable condition suitable for weighing operations. However, due to the fine adjustment provided by the screw threaded positioning of the weight member 80, the center of gravity of the balance beam system may be made to lie very close to coincidence with the axis of the central pivot, yet always slightly below such central pivot. With such adjustment, it is obvious that the balanced beam system will have an unusually high degree of sensibility and accordingly may be utilized to accomplish weight measurements to a degree of accuracy which has heretofore been possible only in the most expensive scales. In such condition, the beam will not be subject to long periods of pendulum vibration since the effective pendulum arm of the system is extremely short.

Having once adjusted the weight member 80 to obtain the degree of sensibility desired for the particular weighing operation for which the scale is to be used, the operation of the scale proceeds in conventional manner. The object or objects to be weighed are placed in one of the trays 31 and sufficient weights are added to the other tray to obtain an approximate balance of the beam 20 as indicated by pointer 48c, whereupon the slide weight 68 is adjusted to obtain the final balance.

From the construction described, it is apparent that this invention provides a weighing device having parts of unusually simple configuration which may be conveniently manufactured by stamping processes. Furthermore, a weighing device embodying this invention permits the adjustment of its sensibility to an unusually high degree irrespective of the fact that all of the major components of the scale have relatively large dimensional tolerances consistent with their manufacture by stamping processes.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In a weighing device having a balance beam, the improvements of means for supporting said beam for pivotal movement about a horizontal axis, said means providing a pivot for said beam disposed below the center of gravity of said beam, a bracket, means for securing said bracket to said balance beam in any selected one of a plurality of longitudinal positions along said beam, a screw supported by said bracket in substantially vertical depending relation to said balance beam, and a nut-like weight member adjustably threaded on said screw, whereby the center of gravity of the balance beam system may be adjusted to lie at a selected small distance below said pivot to obtain a stable support condition for said balance beam and the sensibility of said balance beam may be controlled.

2. In a scale, a balance beam comprising a thin-walled, channel-shaped member having generally vertical arm portions, said arm portions having three pairs of opposed, slot-like apertures therein respectively disposed adjacent the center and end portions of the beam, pivot bars having end portions respectively insertable in and projecting through said apertures, said projecting end portions defining pivot bearing surfaces and being of reduced width to define a pair of spaced outwardly facing shoulders on each of said pivot bars, said shoulders being constructed and arranged to snugly engage the aperture-defining portions of said arm portions, thereby reinforcing said arm portions of the channel-shaped beam against inward deflection.

3. A scale comprising, in combination, spaced, thin-walled uprights, said uprights having wall portions punched outwardly to define opposed recesses, the bottom walls of said recesses defining respectively spaced pivot bearings, a generally channel-shaped balance beam insertable between said uprights, a central pivot bar supported transversely in the flange arms of said channel-shaped balance beam and having its end portions respectively projecting through said flange arms to engage said pivot bearings, a weight pan support bracket having spaced vertical arm portions, said arm portions having wall portions thereof punched outwardly to define opposed recesses, the top walls of said recesses defining respectively end pivot bearings, and a pair of end pivot bars supported transversely in the flange arms of said balance beam respectively at the ends thereof, each of said end pivot bars having the end portions thereof projecting through said flange arms to engage said end pivot bearings of said pan support bracket.

ROY O. RUNDQUIST.

REFERENCES CITED

The following references are of record in the file of this patent:

UNITED STATES PATENTS

| Number | Name | Date |
| --- | --- | --- |
| 327,152 | Fitch | Sept. 29, 1885 |
| 349,570 | Cook | Sept. 21, 1886 |
| 1,128,500 | Pestel | Feb. 16, 1915 |
| 1,489,803 | Vance | Apr. 8, 1924 |
| 1,565,126 | Von Frommer | Dec. 8, 1925 |
| 1,759,900 | Hadley | May 27, 1930 |
| 2,260,813 | Wilson | Oct. 28, 1941 |

FOREIGN PATENTS

| Number | Country | Date |
| --- | --- | --- |
| 516,718 | Germany | Jan. 27, 1931 |